C. P. PARKER.
Barb for Wire Fence.
No. 211,863. Patented Feb. 4, 1879.
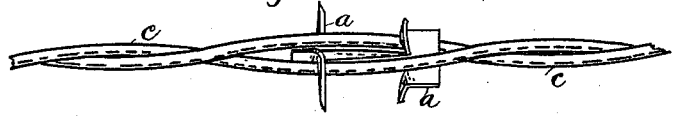
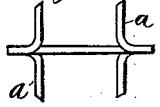 
Witnesses
Thos H. Hutchins
Wm H. Pacey
Inventor
Charles P. Parker

UNITED STATES PATENT OFFICE.

CHARLES P. PARKER, OF JOLIET, ILLINOIS.

IMPROVEMENT IN BARBS FOR WIRE FENCES.

Specification forming part of Letters Patent No. 211,863, dated February 4, 1879; application filed July 1, 1878.

*To all whom it may concern:*

Be it known that I, CHARLES P. PARKER, of the city of Joliet, in Will county, and State of Illinois, have invented certain Improvements in Barbs for Wire Fences, the construction and operation of which I will proceed to explain, reference being made to the annexed drawings, making a part of this specification, in which—

Figure 1 is a perspective view; Fig. 2, a side elevation, and Fig. 3, a plan view on the top.

The nature of my invention consists in the construction of a metal barb having four prongs for points, and cut from a thin strip of metal in such a manner that there will be no waste, and also so constructed that the barb is twisted by the wires between which it is held as the wires are twisted together, without the necessity of twisting them beforehand or before they are placed between the wires.

In the drawings, *a* represents the barb. Fig. 3 represents a barb before it is cut and the points turned out. Fig. 2 shows the barb *a* after it has been cut, but before it is twisted; and at Fig. 1 the barb *a* is shown placed in between the two wires *c*, and taking the twist of the wire only to the extent the wires *c* are twisted.

The barb *a* is cut, as is shown at Fig. 3, in a manner so as to leave a long slender body, connecting the two barbed extremities, as shown at Fig. 2, which long body is slender enough so that the wires *c* will give it the twist as they are twisted together, thus saving the necessity of extra machinery and labor to twist it in advance of placing it between the wires.

It will be seen that by being cut in this mode none of the strip from which it is cut is lost; also by having the long connecting-body the barb is of such length that but little twist is required to be given to the wires *c* to hold the barb *a* in between them, as is shown in Fig. 1.

I am aware of barbs having been used having the four points and being constructed of thin metal somewhat as this; but I am not aware of any barb being constructed with a long connecting-body slender enough so the wires give it all the twist necessary, as in this case, which results in a very great saving of labor and machinery.

The device, when completed as shown in Fig. 1, is intended to be used for fencing purposes, stretched on posts in the ordinary manner.

Having thus described my invention, what I claim as new, and desire to secure by Letters Patent, is as follows, to wit:

The barb *a*, having the long slender body connecting its two extremities, and the body slender enough to twist with the wires *c* as they are being twisted together, with the barb *a* between them, in the manner and for the purpose set forth.

CHARLES P. PARKER.

Witnesses:
 THOS. H. HUTCHINS,
 W. H. PACEY.